AUTOMATIC TELEPHONE SYSTEM WITH CAMP-ON FACILITIES

Filed March 15, 1962 9 Sheets-Sheet 1

INVENTOR
B. L. HESS
BY
J. R. McCorkendale
ATTORNEY

AUTOMATIC TELEPHONE SYSTEM WITH CAMP-ON FACILITIES

Filed March 15, 1962

9 Sheets-Sheet 2

INVENTOR
B. L. HESS
BY
[signature]
ATTORNEY

AUTOMATIC TELEPHONE SYSTEM WITH CAMP-ON FACILITIES

Filed March 15, 1962

9 Sheets-Sheet 3

INVENTOR
B. L. HESS
BY
[signature]
ATTORNEY

Oct. 26, 1965 B. L. HESS 3,214,523
AUTOMATIC TELEPHONE SYSTEM WITH CAMP-ON FACILITIES
Filed March 15, 1962 9 Sheets-Sheet 4

INVENTOR
B. L. HESS
BY
[signature]
ATTORNEY

AUTOMATIC TELEPHONE SYSTEM WITH CAMP-ON FACILITIES

Filed March 15, 1962 9 Sheets-Sheet 5

INVENTOR
B. L. HESS
BY
I. R. McCortendale
ATTORNEY

Oct. 26, 1965 B. L. HESS 3,214,523

AUTOMATIC TELEPHONE SYSTEM WITH CAMP-ON FACILITIES

Filed March 15, 1962 9 Sheets-Sheet 6

INVENTOR
B.L. HESS
BY
[signature]
ATTORNEY

Oct. 26, 1965 B. L. HESS 3,214,523

AUTOMATIC TELEPHONE SYSTEM WITH CAMP-ON FACILITIES

Filed March 15, 1962 9 Sheets-Sheet 7

INVENTOR
B. L. HESS
BY
J. R. McCorkendale
ATTORNEY

AUTOMATIC TELEPHONE SYSTEM WITH CAMP-ON FACILITIES

Filed March 15, 1962

9 Sheets-Sheet 8

INVENTOR
B. L. HESS
BY
J. R. McCorkendale
ATTORNEY

AUTOMATIC TELEPHONE SYSTEM WITH CAMP-ON FACILITIES

Filed March 15, 1962

INVENTOR
B. L. HESS
BY
[signature]
ATTORNEY

United States Patent Office 3,214,523
Patented Oct. 26, 1965

3,214,523
AUTOMATIC TELEPHONE SYSTEM WITH CAMP-ON FACILITIES

Bobby L. Hess, Davenport, Iowa, assignor to American Telephone and Telegraph Company, New York, N.Y., a corporation of New York Filed Mar. 15, 1962, Ser. No. 179,869
12 Claims. (Cl. 179—18)

This invention relates to a telephone system and more particularly to an automatic telephone system with camp-on facilities.

In the modern day telephone field there has been an increasing demand on the part of telephone users that the so-called camp-on feature be made available. Camp-on facilities provide, in general, that when a connection is attempted to a called line and the called line is found to be busy, the partially completed connection is "held" until the called line becomes free, whereupon the connection is completed and the called party is rung.

Many subscribers favor this holding service over the alternative procedure of hanging up when a busy line is encountered and making repeated attempts until their call goes through and, accordingly, a number of different arrangements have been developed in the past for providing camp-on facilities in automatic telephone systems. However, these prior arrangements have, in the main, tied up the calling switch train through the office while the partially completed connection is being held. Further, in those arrangements involving ringback, that is, where the calling party is permitted to hang up and is rung back when the call has been completed to the called party, it often occurs that the calling party is not immediately available to answer the ringback signal even though the called party has been brought in on the connection. For these, and other reasons, many of the arrangements previously proposed for providing camp-on facilities have not proven entirely satisfactory.

Accordingly, it is an object of my invention to improve the arrangement and operation of camp-on circuits.

A further object of the invention is to make the calling switch train available for other calls while the camp-on facility is effective.

A still further object of the invention is to assure that the called party, when free, will not be brought in on the connection until the calling party is also available.

According to a specific embodiment of the invention as applied in connection with an automatic telephone system of the step-by-step type, when a calling subscriber dials a busy called line, which line is equipped for camp-on, the calling subscriber is automatically connected to an announcing machine which transmits an announcement to him that the called line is busy and that, if he will proceed to dial the last two digits of the called number together with his own complete number, he will be called when the called line becomes available. The digits then dialed are stored in a register circuit and the calling subscriber, after completing the dialing, goes on-hook and the calling switch train is released. The called line is then checked at predetermined intervals, as determined by a timer circuit, and if found on-hook is seized. On the other hand, if the called line is found still busy at a check interval, the timer is recycled for the next test. After seizure of the called line, a connection to the calling station is re-established through the switch train, and the station is rung and, if the calling party responds, the called line is rung and the call is under control of the calling party as in a normal call. If the calling party does not respond within a predetermined interval, however, or if his line is busy, the timer is recycled for another attempt. The called line, while seized as above stated, is not actually rung until the calling party is on the line for completion of the call.

A feature of the invention is means effective when a busy line is dialed to automatically convey procedural instructions to the calling subscriber.

A further feature of the invention is means for periodically checking the condition of a called line and for seizing the called line when found "on-hook."

A still further feature is means for recycling the checking means each time the called line is checked and found "off-hook."

An additional feature of the invention is means for ringing back the calling subscriber when the called line is checked and found to be on-hook.

Yet another feature of the invention is means for recycling the ringback means if the calling party does not respond within a predetermined interval or if his line is busy when the connection is attempted.

Yet an additional feature of the invention is the utilization of an auxiliary line for the camp-on surveillance whereby to free the original switch train for other calls.

A full understanding of the arrangement contemplated by the present invention as well as an appreciation of the various advantageous features thereof may be gained from consideration of the following detailed description in connection with the accompanying drawing, in which.

Figure 3:
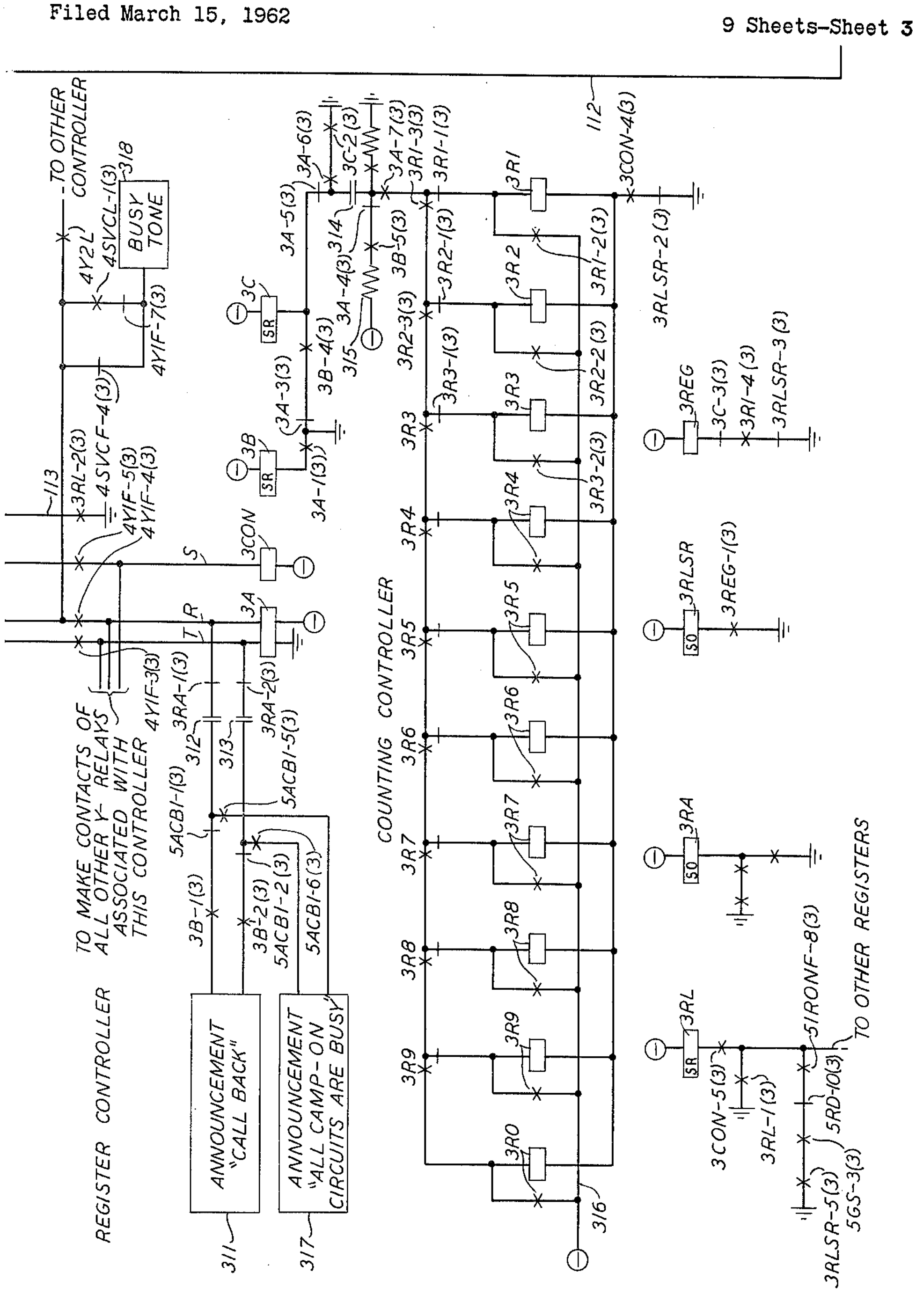
FIG. 3 shows particularly the connection of the announcement and tone sources and the counting controller relay chain.
Figure 4:
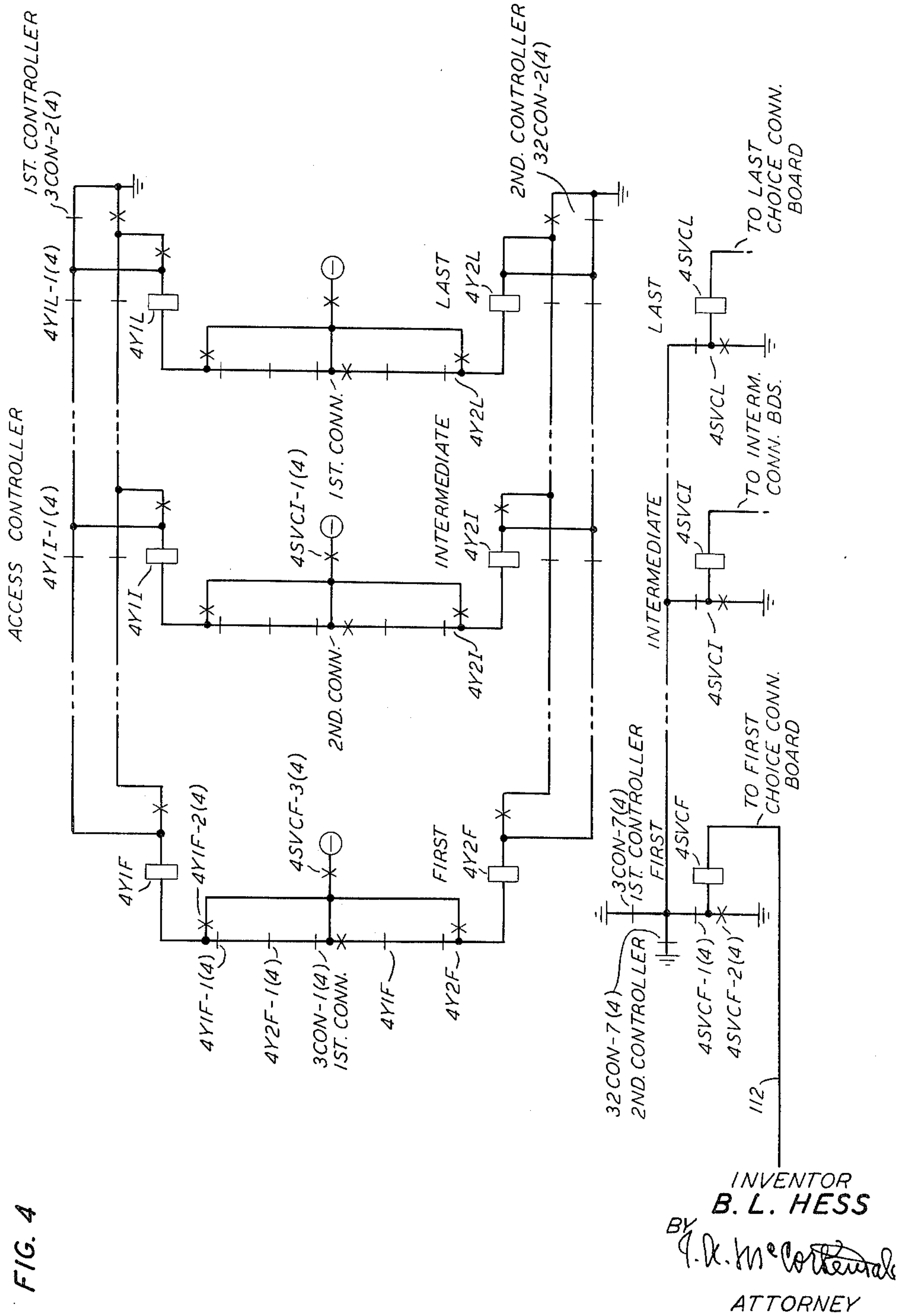
FIG. 4 shows particularly the access controller circuit.

In order to facilitate the consideration of the subsequent detailed description, the reference designation of each equipment item includes a digit prefix indicating the figure of the drawing in which the item appears; for example, relay 3CON apears in FIG. 3 while relay 4Y1F appears in FIG. 4. Further, each relay contact designation includes a parenthesized digit which indicates the figure of the drawing in which the contact appears; for example, contact 3CON–1(4) is a contact of relay 3CON which appears in FIG. 4 of the drawing while the relay itself, as just stated, appears in FIG. 3.

*General description of system*

A detailed description of the novel circuits included in the camp-on arrangement contemplated by the invention will be given subsequently with particular reference to FIGS. 1 to 8. However, there will first be given a brief general description of the association of the camp-on circuits with a typical step-by-step telephone system, particular reference being made to FIG. 9 in this connection.

Figure 9:
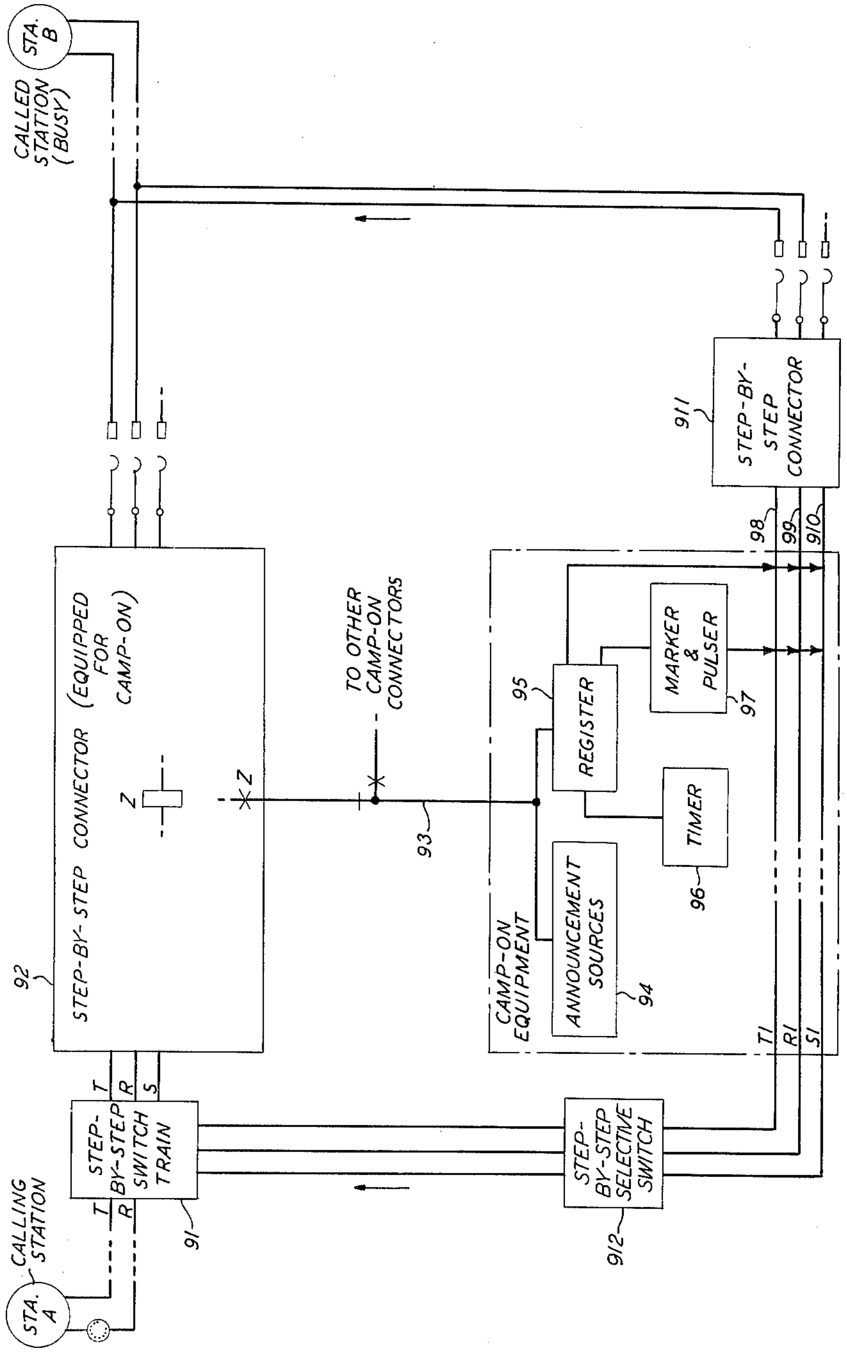
FIG. 9 shows schematically the association of one specific illustrative embodiment of the camp-on circuit contemplated by the invention with portions of a typical step-by-step telephone system.

Referring then to FIG. 9, it will be assumed that calling station A has dialed the number of station B but that station B is already "busy" on another call. Step-by-step switch train 91 will be assumed to be of standard arrangement, well known in the telephone switching art, while connector 92 is generally of standard arrangement, as disclosed for example in United States Patent 1,925,-681, issued September 5, 1933 to Messrs. A. Uda and T. Okura. The connector is modified, however, in accordance with the present invention by the addition of a camp-on control relay (which is designated in the Z series in the subsequent detailed description).

When the called station B tests "busy," the camp-on control relay referred to operates and brings in the camp-on elements shown within the dot-dash box. As indicated by the transfer contacts provided in line 93, and as will be described in detail subsequently, a preference circuit is included in the over-all arrangement whereby the camp-on circuit may serve several different connectors on an "in-turn" basis. Assuming that the camp-on circuit is immediately available to serve connector 92, announcement source 94 will be connected over line 93 to connector 92 and to the line of calling station A; a pre-recorded announcement is transmitted to the calling subscriber to the effect that the called station B is busy and that, if he will dial the last two digits of the called station number followed by his entire station number, his station will be rung back as soon as the called station becomes idle. The digit information then dialed by the calling subscriber at station A is stored in register 95, and upon completion of dialing, station A goes on-hook and switch train 91 and connector 92 are released.

The registered digit information for the called line is outpulsed under control of a timing circuit, and an auxiliary line comprising tip 98, ring 99 and sleeve 910, is connected to the called station line terminals through step-by-step connector 911 (of the usual arrangement well known in the art); at definite intervals, of duration determined by timer 96, register 95 operates through marker and pulser 97 to check whether or not the called line has become idle and gone on-hook. If the called line is still busy, timer 96 is recycled and the next check period is awaited; connector 911 may be released during this waiting period for use in other calls. If the called line is found idle, it is seized, but not rung, and the calling station line is seized over the auxiliary line through suitable pulse responsive selective switch 912 and through switch train 91, or another similar train, and is rung back. If the calling party does not respond to the ringback within a predetermined interval, or if his line is found busy, the register is recycled and the ringback repeated at the end of the next time interval. When the calling party does respond to the ringback, marker-pulser 97 is released, the called party is rung and control of the circuit is given to the calling party as in a normal call.

When the calling party goes on-hook at the completion of the call the camp-on facilities are released for service on other calls.

While, in order to avoid complication of the schematic layout of FIG. 9, line 93 is shown as a single path, actually tip, ring and sleeve conductors and several control paths are included in the connection between the connector and the camp-on equipment. This will be apparent from the subsequent detailed description.

*Detailed description of system—Call initiated*

Figures 1, 10:
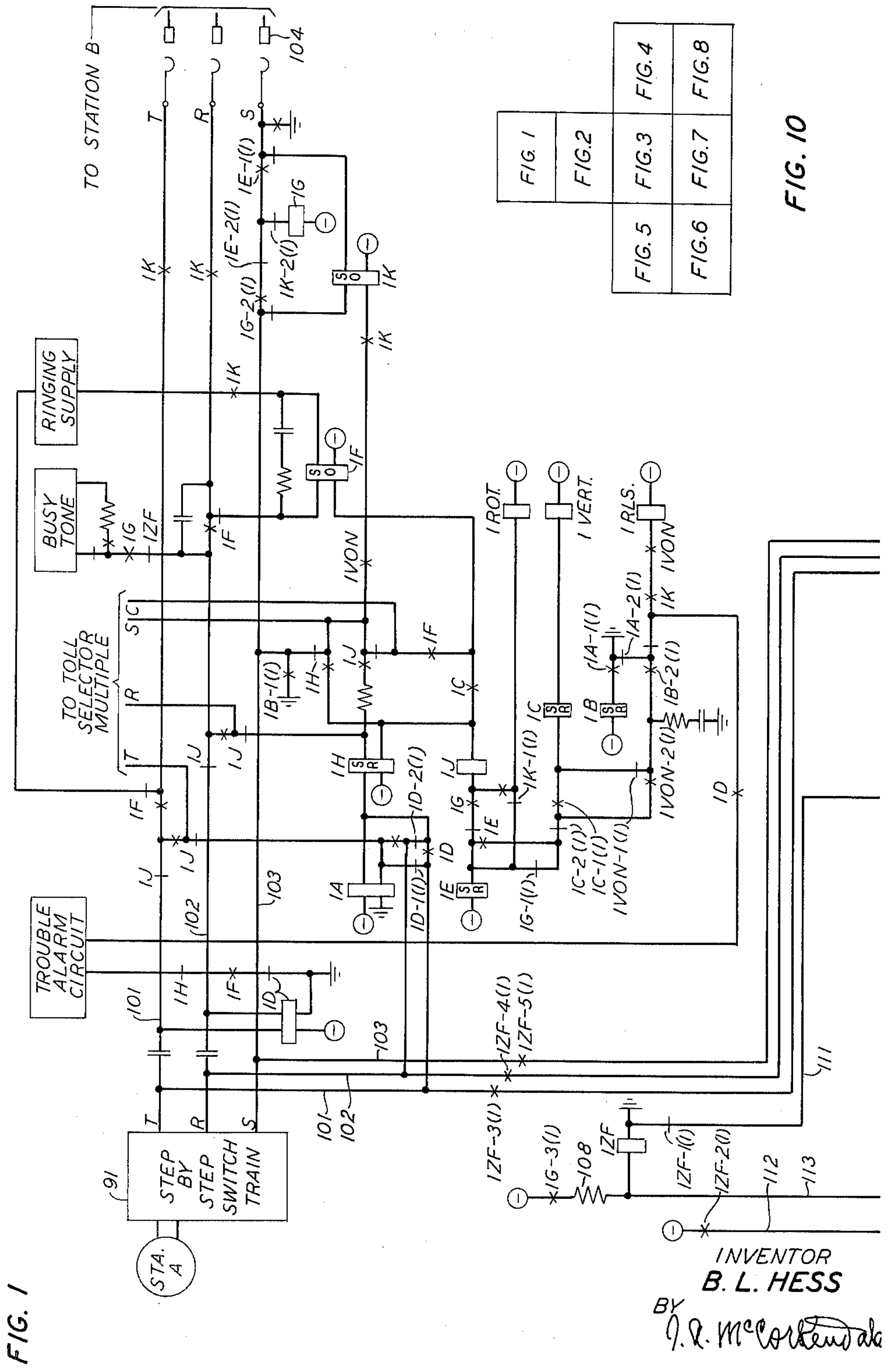
FIG. 1 shows a step-by-step connector circuit adapted for use with one specific illustrative embodiment of the camp-on circuit contemplated by the present invention.
FIG. 10 shows the manner in which certain of the figures of the drawing should be arranged when in use.
Figure 2:
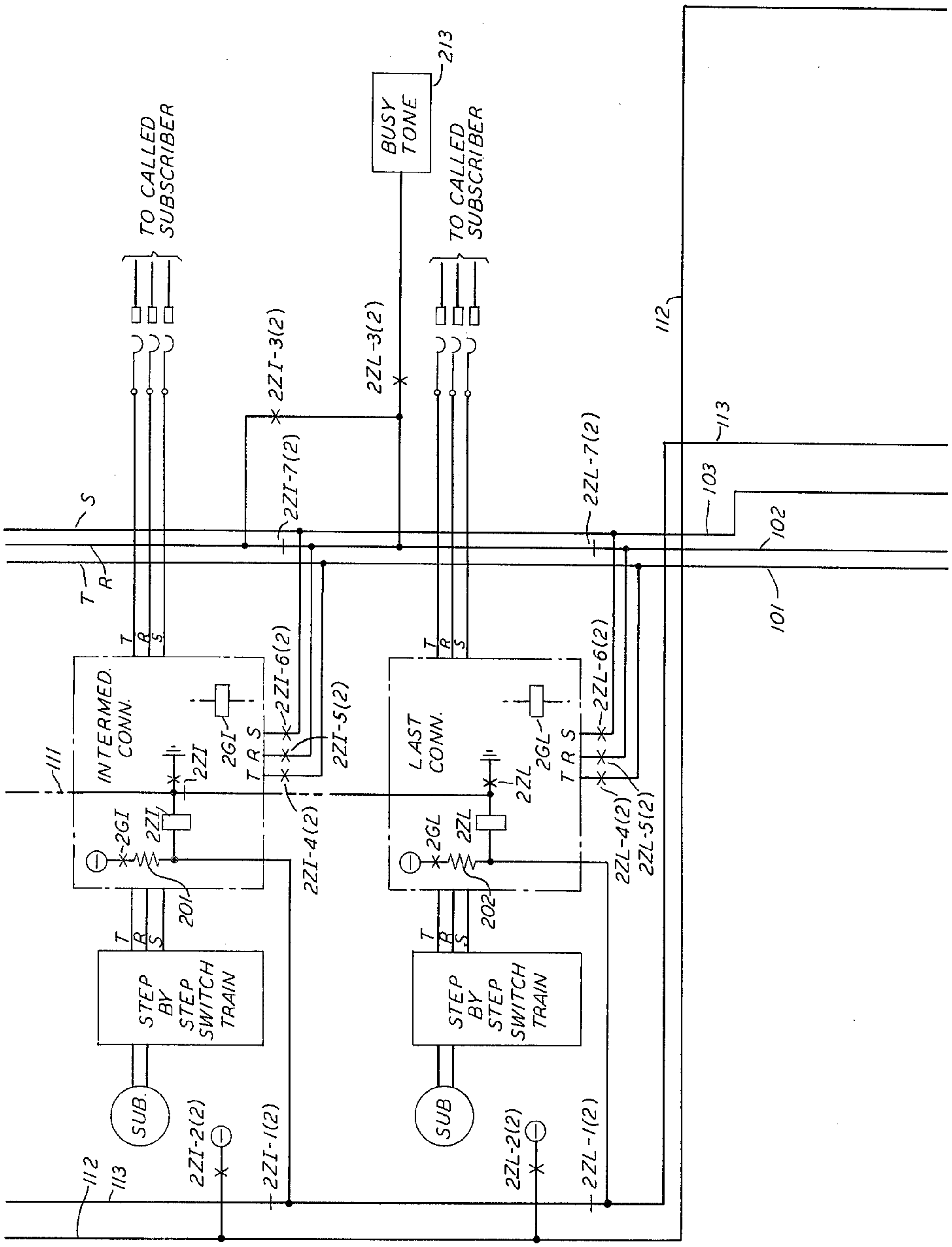
FIG. 2 shows schematically the application of certain control portions of the camp-on circuit to two other connectors of the system.

Referring now particularly to FIGS. 1 to 8 of the drawing, a detailed description of the system, as illustrated schematically in FIG. 9 and briefly described above, will be given. The step-by-step connector shown in detail in FIG. 1, and corresponding to connector 92 of FIG. 9, is assumed to be the first in a "connector board" group serviced by the common camp-on facility, while there are indicated in FIG. 2 by dot-dash boxes the intermediate and the last connectors of the same group.

In accordance with the well understood operation of standard step-by-step connector circuits, when the connector circuit of FIG. 1 is seized by switch train 91 in the usual manner by the dialing of a predetermined number of digits, a path is closed for operation of relay 1A traced from battery, upper winding of relay 1A, break contact 1D–2(1) of relay 1D, ring lead 102, closed loop at calling station A, tip lead 101, break contact 1D–1(1) of relay 1D, lower winding of relay 1A to ground. Relay 1A operates and completes through its 1A–1(1) make contact an obvious operate path for relay 1B. Relay 1B, upon operation, connects ground through its 1B–1(1) make contact to sleeve lead 103 as a busy indication to hold switch train 91 operated.

Now, as the calling subscriber dials the next digit of the called number, relay 1A releases and reoperates in step with the resulting transmitted pulses. Upon the first release of relay 1A, a path is completed for operation of vertical magnet 1VERT and relay 1C, this path being traced from ground, break contact 1A–2(1) of relay 1A, make contact 1B–2(1) of relay 1B (which has a slow-release characteristic), break contact 1VON-1(1) of the vertical off-normal switch (a switch closed mechanically when the vertical magnet 1VERT moves off-normal), windings of relay 1C and vertical magnet 1VERT in series to battery. When the first vertical step of the connector switch is taken, by action of vertical magnet 1VERT and when relay 1C operates, that portion of the path just traced which was completed through break contact 1VON–1(1) of the vertical off-normal switch is now replaced by a portion completed through make contact 1VON–2(1) of the switch (now operated) and make contact 1C–1(1) of relay 1C. This latter path is maintained, due to the slow release characteristic of relay 1C, during the time the succeeding pulses of the dialed digit step the brushes of the connector to the desired vertical level. As soon as the series of impulses ends, relay 1C releases and will not again reoperate due to the above-referred-to change in the operating path at contacts of the vertical off-normal switch.

Now when the final digit of the called number is dialed, the first impulse will cause operation of rotary magnet 1ROT and relay 1E in parallel. The path for operation of the rotary magnet 1ROT is traced from battery, magnet winding, break contacts 1K–1(1) of relay 1K, 1G–1(1) of relay 1G, and 1C–2(1) of relay 1C, make contact 1VON–2(1) of the vertical off-normal switch, make contact 1B–2(1) of relay 1B, break contact 1A–2(1) of relay 1A to ground. (Relay 1B remains operated during the pulsing, and resultant intermittent operation of relay 1A, due to its slow-release characteristic.) The operate path for relay 1E leads from battery, winding of relay 1E, and from break contact 1G–1(1) of relay 1G coincides with the operating path traced for magnet 1ROT.

During the succeeding dialed impulses, rotary magnet 1ROT will step the brushes of the connector in a rotary direction until the terminals of the called line are reached. During this time relay 1E operates in step with the rotary magnet and releases after the pulses cease.

*Called station busy on prior call*

If the called station B is idle, the line will be seized, machine ringing will be applied and the connection will be seized, machine ringing will be applied and the connection will be completed in the normal way. Assuming, on the other hand, that station B is already busy on a prior call, ground will be present on sleeve terminal 104 and relay 1G will operate from this ground through make contact 1E–1(1) of relay 1E (which has not yet restored to normal due to its slow-release characteristic), break contact 1K–2(1) of relay 1K, winding of relay 1G to battery. When relay 1E does release, a holding path for relay 1G is established through break contact 1E–2(1) of relay 1E, make contact 1G–2(1) of relay 1G, make contact 1B–1(1) of relay 1B to ground.

Up to this point the described operation of the connector circuit has been that of a standard connector circuit of a type well known in the art. In accordance with the features of the present invention, however, and as pointed out above, each connector circuit is modified by the addition of a camp-on control relay designated in the Z series. Thus, in the "first" connector of the group, FIG. 1, the 1ZF relay is provided; in the "intermediate" connector, FIG. 2, the 2ZI relay is provided and in the "last" connector, also FIG. 2, the 2ZL relay is provided. A resistor is included in the operate path of each "Z" relay, resistor 108 being included in the operate path of relay 1ZF, resistor 201 in the operate path of relay 2ZI and resistor 202 in the operate path of relay 2ZL. These resistors are of successively decreasing value from first to last so that in the event of simultaneous seizure of the "Z" relays, the "last choice" relay will operate first. This comprises the "preference" circuit mentioned above and will be further discussed subsequently.

Returning now to description of the connector of FIG. 1, operationof relay 1G completes a path for operation of relay 1ZF from battery, make contact 1G–3(1) of relay 1G, resistor 108, winding of relay 1ZF to ground. Assuming that no "G" relays of other connectors of the group, for example relay 2GI of the intermediate connector or relay 2GL of the last connector, are operated simultaneously with relay 1G, relay 1ZF will now operate over the path traced. Several circuit actions result from operation of relay 1ZF. First, the connection of ground over lead 111 to the other connectors is interrupted at break contact 1ZF–1(1). Second, battery is connected through make contact 1ZF–2(1) to lead 112 and thereover to the access controller circuit (FIG. 4) where it passes through the winding of the associated relay 4SVCF and through break contacts 4SVCF–1(4) of relay 4SCVF and 32CON–7(4) of relay 32CON (referred to below) to ground. Relay 4SVCF operates and locks to ground through its make contact 4SVCF–2(4). Third, with relay 1ZF operated, tip, ring and sleeve leads 101, 102 and 103 are cut through at make contacts 1ZF–3(1), 1ZF–4(1) and 1ZF–5(1) and break contacts 2ZI–7(2) and 2ZL–7(2) towards the other connectors of the group.

Relay 32CON referred to in the preceding paragraph is a control relay associated with the second controller and corresponds in function and operation to relay 3CON of the first controller. The alternate paths to ground through respective break contacts 3CON–7(4) and 32CON–7(4) included in the operate path of relay 4SVCF are provided in order that relay 4SVCF may operate only if a controller is available. If neither controller is available then both relays 3CON and 32CON will be operated and the operate path for relay 4SVCF will not be completed. In such event, that is, if relay 4SVCF does not operate, then busy tone from source 318 will be applied through break contact 4SVCF–4(3) to ring lead 102. In the situation previously described where a controller was assumed to be available and relay 4SVCF operated, the busy tone was not applied to ring lead 102, of course, since the path was interrupted at break contact 4SVCF–4(3) of relay 4SVCF. Under certain conditions, however, the busy tone may be supplied to another line attempting a connection to the second controller, break contact 4Y1F–7(3) of relay 4Y1F and make contact 4SVCL–1(3) of relay 4SVCL being included in this connection.

When relay 4SVCF (FIG. 4) operates, as above described, relay 4Y1F is operated over a path from battery, make contact 4SVCF–3(4) of relay 4SVCF, break contacts 3CON–1(4) of relay 3CON, 4Y2F–1(4) of relay 4Y2F, 4Y1F–1(4) of relay 4Y1F, winding of relay 4Y1F, break contacts 4Y1I–1(4) of relay 4Y1I, 4Y1L–1(4) of relay 4Y1L and 3CON–2(4) of relay 3CON to ground. Relay 4Y1F operates and transfers a portion of the above path through its make contact 4Y1F–2(4). Relay 4Y1F, operated, closes the tip, ring and sleeve leads 101, 102 and 103, respectively, through to relays 3A and 3CON (FIG. 3) at make contacts 4Y1F–3(3), 4Y1F–4(3) and 4Y1F–5(3). These operations are preparatory to connection of the "announcement" discussed above in connection with FIG. 9.

Upon closure of the tip, ring and sleeve leads as just mentioned, relay 3CON operates from the sleeve ground and relay 3A operates through the closed station loop. Relay 3A, operated, completes through its 3A-1(3) make contact an obvious operating path for relay 3B. Relay 3B, upon operating, closes a path for connecting announcing machine 311 to the tip and ring line leads 101 and 102, this path also including break contacts 5ACB1–1(3) and 5ACB1–2(3) of relay 5ACB1, break contacts 3RA–1(3) and 3RA–2(3) of relay 3RA, and capacitors 312 and 313.

Also, following the operation of relay 3A and before the above-described operation of relay 3B is completed, a path is completed for operation of relay 51RONF (FIG. 5), traced from ground, make contact 3A–2(5) of relay 3A, break contacts 3B–3(5) of relay 3B, 52RONF–1(5) of relay 52RONF and 51RONF–1(5) of relay 51RONF, winding of relay 51RONF, make contact 4Y1F–6(5) of relay 4Y1F, break contact 5RD–1(5) of relay 5RD to battery. Relay 51RONF, upon operating, locks to ground through its make contact 51RONF–2(5) and does not release following the above-described operation of relay 3B. Relay 51RONF is instrumental in establishing operate paths for the register relays, the operation of which will be described subsequently.

A suitable message, prerecorded on announcing machine 311 is now transmitted over the tip and ring conductors of the line to the calling subscriber at station A. This message may be to the effect, for example, that the called station is busy on another call, and that if he, the calling subscriber, will proceed to dial the last two digits of the called station followed by his own complete number, his station will be rung as soon as the called station is free. (It may happen, of course, that all registers may be busy at the moment, in which event the calling subscriber should be advised that camp-on service is not immediately available. An announcement to this effect is given, under these circumstances, from source 317 in a manner that will be described subsequently.)

Relay 5AA (FIG. 5) now operates over a path from ground, make contact 3CON–3(5) of relay 3CON, break contacts 3C–1(5) of relay 3C and 3RLSR–1(5) of relay 3RLSR, make contact 51RONF–3(5) of relay 51RONF, break contact 5RD–2(5) of relay 5RD, break contact 5AA–1(5) and winding of relay 5AA, break contact 6REL–1(5) of relay 6REL, to battery. Relay 5AA, upon operating, locks to ground on lead 511 through its make contact 5AA–2(5) and break contact 5RD–5(5) of relay 5RD.

Now, as the calling subscriber dials in accordance with the above-referred-to announcement from source 311, both relays 1A of the connector circuit (FIG. 1) and relay 3A of the register controller (FIG. 3) will operate in step with the pulses. However, the connector switch (FIG. 1) will not be stepped further by these additional pulses since the stepping path is open at break contact 1G–1(1) of relay 1G. In the register controller circuit (FIG. 3), on the other hand, the pulses are "counted" by the novel arrangement provided. Upon the first release of relay 3A, with relay 3B remaining operated (due to its slow-release characteristic), relay 3C will operate over a path from ground, break contact 3A–3(3) of relay 3A, make contact 3B–4(3) of relay 3B, winding of relay 3C to battery. Now, as relay 3A operates and releases in step with the pulses, we have alternate charge and discharge paths for capacitor 314. When relay 3A is released the charge path may be traced from battery, resistor 315, make contact 3B–5(3) of relay 3B, break contact 3A–4(3) of relay 3A, capacitor 314, break contact 3A–5(3) of relay 3A, make contact 3B–4(3) of relay 3B, break contact 3A–3(3) of relay 3A to ground. When relay 3A is operated, capacitor 314 discharges through the winding of relay 3R1, and operates that relay over a path through make contact 3A–7(3) of relay 3A, break contact 3R1–1(3) and winding of relay 3R1, make contact 3CON–4(3) of relay 3CON, break contact 3RLSR–2(3) of relay 3RLSR to ground. Relay 3R1, upon operating, locks from battery, lead 316, its own make contact 3R1–2(3) and winding, make contact 3CON–4(3) of relay 3CON, break contact 3RLSR–2(3) of relay 3RLSR to ground.

The next pulse charges capacitor 314, as above described, and in this instance the discharge path is diverted to relay 3R2, through make contact 3R1–3(3) of relay 3R1 and break contact 3R2–1(3) of relay 3R2. Relay 3R2 operates and locks over a path from battery, lead 316, make contact 3R2–2(3) and winding of relay 3R2, make contact 3CON–4(3) of relay 3CON, break contact 3RLSR–2(3) of relay 3RLSR to ground. The next pulse will operate relay 3R3 over an obvious path including make contact 3R2–3(3) of relay 3R2 and break contact 3R3–1(3) of relay 3R3, and relay 3R3, upon operating, will lock over an obvious path which includes its own make contact 3R3–2(3). This "counting" continues until the completion of the first digit dialed, the particular relays in the counting group which are operated indicating the number of pulses in the first digit dialed.

During the interval following completion of the first digit, relay 3C will release and this will be followed by operation of relay 3REG over a path from battery, winding of relay 3REG, break contact 3C–3(3) of relay 3C, make contact 3R1–4(3) of relay 3R1, break contact 3RLSR–3(3) of relay 3RLSR to ground. Relay 3REG, operated, completes at its make contact 3REG–1(3) an operating path for relay 3RLSR which has a slow-operate characteristic. Before relay 3RLSR operates and breaks at its 3RLSR–3(3) break contact the operate path for relay 3REG, paths are completed for operation of register relays (FIG. 6) for "storing" the first digit. Assuming that only relays 3R1 and 3R2 of the counting circuit (FIG. 3) are operated, paths are completed for operating relays 6R0 and 6R2, these paths being traced as follows. The path for operating relay 6R0 is traced from ground, lead 611, make contact 3R1–5(6) of relay 3R1, break contacts 3R3–3(6) of relay 3R3, 3R5–1(6) of relay 3R5 and 3R8–1(6) of relay 3R8, make contact 3REG–2(6) of relay 3REG (which, due to the slow-operate characteristic of relay 3RLSR, has not yet released), make contact 51RONF–4(6) of relay 51RONF, break contacts 5RD–3(6) of relay 5RD, 5GS–4(6) of relay 5GS, 5AS–3(6) of relay 5AS and 5BB–1(6) of relay 5BB, winding of relay 6R0 to battery. (As indicated by the dotted portion, this operate path also includes break contacts of the intervening "insteering" relays 5BS to 5FS. These contacts are not shown in FIG. 6 in order to avoid undue complication of the drawing.) Relay 6R0 operates and locks to ground through its 6R0–1(6) make contact and break contact 6REL–2(6) of relay 6REL. The operate path for relay 6R2 is traced from ground, lead 611, make contact 3R2–4(6) of relay 3R2, break contacts 3R4–1(6) of relay 3R4, 3R7–1(6) of relay 3R7 and 3R0–1(6) of relay 3RO, make contacts 3REG–3(6) of relay 3REG and 51RONF–5(6) of relay 51RONF, break contacts 5RD–4(6) of relay 5RD, 5GS–6(6) of relay 5GS (and break contacts of intervening insteering relays), 5AS–7(6) of relay 5AS, and 5BB–2(6) of relay 5BB, winding of relay 6R2 to battery. Relay 6R2 operates and locks to ground through its make contact 6R2–1(6) and break contact 6REL–2(6) of relay 6REL.

When relay 3RLSR operates over the path described above, the holding paths for relays 3R1 and 3R2 of the counting circuit (FIG. 3) are opened at break contact 3RLSR–2(3) and the relays restore to normal for reception of the next digit dialed. Also, relay 3RLSR, operated, completes an operate path for relay 5BB, the insteering relay for the next digit, this path being traced from ground, make contact 3CON–3(5) of relay 3CON, break contact 3C–1(5) of relay 3C, make contacts 3RLSR–4(5) of relay 3RLSR and 51RONF–6(5) of relay 51RONF, break contacts 5RD–6(5) of relay 5RD and 5BB–4(5) of relay 5BB, winding of relay 5BB, break contact 6REL–1(5) of relay 6REL to battery. Relay 5BB, upon operating, locks to ground on lead 511 through its make contact 5BB–5(5) and break contact 5RD–5(5) of relay 5RD.

Relay 3REG releases, following operation of relay 3RLSR, since its operate path is opened at break contact 3RLSR–3(3) of relay 3RLSR; relay 3RLSR releases following release of relay 3REG since its operate path is opened at make contact 3REG–1(3).

With the operation of relay 5BB, the paths for supply of the digit information to the register relays (FIG. 6) are transferred at make contacts 5BB–6(6), 5BB–7(6), 5BB–8(6), 5BB–9(6) and 5BB–10(6) from the 6R0–6R7 register relays of the AA digit register to similar relays of the BB digit register. In order to avoid undue complication of the disclosure and since the arrangement and operation of digit registers is well known in the art, the register relays of register BB, or of the other registers AS to GS, inclusive, are not shown. It will be understood that the usual arrangement of relays 0, 1, 2, 4 and 7, as in the instance of the AA register, is provided.

Now, as the second digit is dialed, the pulses are "counted" by operation of the counting relays (FIG. 3) in the manner described above in connection with the dialing of the first digit. In this instance it will be assumed that relays 3R1, 3R2, 3R3 and 3R4 are operated by the pulses of the second digit and are held over the respective locking paths previously described. This will result in the operation of the "0" and "4" register relays of the BB register corresponding respectively to the 6R0 and 6R4 relays of the AA register described above. The operate path for the "0" relay is traced from ground, lead 611, make contact 3R1–5(6) of relay 3R1, make contact 3R4–2(6) of relay 3R4, break contacts 3R5–1(6) of relay 3R5 and 3R8–1(6) of relay 3R8, make contacts 3REG–2(6) of relay 3REG and 51RONF–4(6) of relay 51RONF, break contacts 5RD–3(6) of relay 5RD, break contacts of intervening insteering relays including break contact 5GS–4(6) of relay 5GS, and 5AS–3(6) of relay 5AS, make contact 5BB–6(6) of relay 5BB and through the winding of the "0" relay (not shown) of the BB register to battery. The relay operates and locks over a path similar to that described above for relay 6R0. The operate path for the "4" relay of the BB register is traced from ground, lead 611, make contact 3R4–3(6) of relay 3R4, break contact 3R7–2(6) of relay 3R7, make contacts 3REG–4(6) of relay 3REG and 51RONF–7(6) of relay 51RONF, break contacts 5RD–7(6) of relay 5RD, 5GS–8(6) of relay 5GS and break contacts of other intervening insteering relays, 5AS–9(6) of relay 5AS, make contact 5BB–9(6) of relay 5BB to the winding of the "4" relay (not shown) and battery. The "4" relay operates and locks to ground over its own make contact.

Upon completion of the dialing of the second impulse, relay 3C releases, as described above in reference to the dialing of the first impulse, and this is followed by operation of relay 3REG over the previously described path from ground, break contact 3RLSR–3(3) of relay 3RLSR, make contact 3R1–4(3) of relay 3R1, break contact 3C–3(3) of relay 3C, winding of relay 3REG to battery. Relay 3RLSR operates following operation of relay 3REG over an obvious path through make contact 3REG–1(3) of relay 3REG. Operation of relay 3RLSR completes an operate path for relay 5AS, the next insteering relay, traced from ground, make contact 3CON–3(5) of relay 3CON, break contact 3C–1(5) of relay 3C, make contacts 3RLSR–4(5) of relay 3RLSR and 51RONF–6(5) of relay 51RONF, break contact 5RD–6(5) of relay 5RD, make contact 5BB–11(5) of relay 5BB, break contact 5AS–2(5) of relay 5AS, winding of relay 5AS, break contact 6REL–1(5) of relay 6REL to battery. Relay 5AS operates and locks to ground through its make contact 5AS–1(5) and break contact 5RD–5(5) of relay 5RD.

Operation of relay 5AS transfers at its make contacts 5AS–4(6), 5AS–6(6), 5AS–8(6), 5AS–10(6) and 5AS–12(6) the connection of the digit pulse register leads (FIG. 6) to the AS register (not shown) which is assumed to be similar to the AA and BB registers discussed above.

The dialing of the respective digits and registering of the resulting pulses proceeds in the above manner until the dialing has been completed. The "insteering" relays (FIG. 5) operate in turn and hold operated until finally, upon operation of relay 5GS the last in the series, a path is completed for operation of relay 3RL, this path being traced from ground, make contacts 3RLSR–5(3) of relay 3RLSR and 5GS–3(3) of relay 5GS, break contact 5RD–10(3) of relay 5RD, make contacts 51RONF–8(3) of relay 51RONF and 3CON–5(3) of relay 3CON, winding of relay 3RL to battery. Relay 3RL, upon operating locks to ground through its make contact 3RL–1(3). Relay 3RL, operated, completes a path for shunting the operating battery and releasing relay 1ZF, this shunt path being traced from battery, make contact 1G–3(1) of relay 1G, resistor 108, lead 113, break contact 2ZI–1(2) of relay 2LI and 2ZL–1(2) of relay 2ZL, make contact 3RL–2(3) of relay 3RL to ground. Relay 1ZF, upon releasing, disconnects at its make contacts 1ZF–3(1), 1ZF–4(1) and 1ZF–5(1) the camp-on controller (FIG. 4) and associated circuits from the connector (FIG. 1) so that the connector may be available for other calls, the calling subscriber having gone on-hook at this point.

Also, upon operation of relay 5GS, as above mentioned, a path is completed for operating relay 5RD, which path is traced from ground, make contact 3CON–3(5) of relay 3CON, break contact 3C–1(5) of relay 3C, make contacts 3RLSR–4(5) of relay 3RLSR and 51RONF–6(5) of relay 51RONF, break contact 5RD–6(5) of relay 5RD, make contacts 5BB–11(5) of relay 5BB, 5AS–13(5) of relay 5AS, 5BS–1(5) of relay 5BS, 5CS–1(5) of relay 5CS, 5DS–1(5) of relay 5DS, 5ES–1(5) of relay 5ES, 5FS–1(5) of relay 5FS and 5GS–1(5) of relay 5GS, break contact 5RD–8(5) of relay 5RD, winding of relay 5RD, break contact 6REL–1(5) of relay 6REL to battery. Relay 5RD operates and locks to ground through its make contact 5RD–9(5).

Relay 5RD, operated, interrupts at its 5RD–5(5) break contact the holding paths for the insteering circuit relays 5AA–5GS and these relays restore to released position.

The operation of relay 5RD, as just described, starts operation of the timer circuit (FIG. 7) which corresponds in function to timer 96 described above in connection with FIG. 9. A path is closed for energizing heater element 711 of the thermal timer from ground, break contacts 7RC–1(7) of relay 7RC and 7RLSM–1(7) of relay 7RLSM, make contact 5RD–11(7) of relay 5RD, break contact 7MSA–1(7) of relay 7MSA, heater 711 to battery. After a predetermined heating period the thermal timing element operates to close lines 712 and 713 and lines 714 and 715, respectively. This establishes an operate path for relay 7MSA traced from battery, winding of relay 7MSA, lines 714 and 715, make contact 5RD–11(7) of relay 5RD, break contacts 7RLSM–1(7) of relay 7RLSM and 7RC–1(7) of relay 7RC to ground. Relay 7MSA operates and locks to ground through its 7MSA–2(7) make contact. Relay 7MSA, operated, opens the energizing path for heater 711 at break contact 7MSA–1(7) and respective lines 712–713 and 714–715 are opened. At this point a previous shunting path for the battery through resistor 716 is opened at break contact 7MSA–3(7) of relay 7MSA and relay 7MS operates from this battery through resistor 716, make contact 5RD–12(7) of relay 5RD, winding of relay 7MS, break contacts 7RLSM–2(7) of relay 7RLSM and 7RC–2(7) of relay 7RC to ground.

Relay 7MS, operated, closes at its 7MS–1(7) make contact, an operate path for relay 7BYF (through resistor 718 and the relay winding to ground) or for one of the succeeding relays 7BYI or 7BYL. There is one "7BY" relay associated with each available toll connector (as connector 911) in the called party's connector "board." (In step-by-step offices connectors are usually mounted in groups on metal frames which are commonly referred to as "connector boards.") Any relay of the 7BY series is prevented from operating, if the respectively associated connector is busy, due to the shunting effect of the sleeve ground. For example, in the above-referred-to operation of relay 7BYF, had connector 911 already been busy, relay 7BYF would not have operated as the battery path would have been shunted by the sleeve ground over lead 725. Similarly, when the "intermediate" connector is busy a shunting ground is applied over lead 730 and when the "last" connector is busy a shunting ground is applied over lead 731.

Contact 7BYF–10(7) of relay 7BYF is an "early break," contacts 7BYI–1(7) and 7BYI–2(7) of relay 7BYI are "early break" and "late break," respectively, and contact 7BYL–1(7) of relay 7BYL is "late break." When battery is applied to lead 717 through make contact 7MS–1(7) all "available" 7BY relays will attempt to operate, that is, all those whose operate paths are not shunted by sleeve ground. However, the early break contact of the first relay operated will open the operate paths of the succeeding relays before they have a chance to fully operate thus assuring that only one of the group will operate. The late break contacts 7BYI–2(7) and 7BYL–1(7) prevent the operation of any earlier sequence 7BY relays, which were previously unavailable due to shunting sleeve grounds, upon their becoming available. Such operation would, of course, interfere with the connector being used.

When relay 7BYF operates as above described, the connection of lead 725 to sleeve lead 723 is interrupted at break contact 7BYF–5(7) whereby to prevent release of relay 7BYF by sleeve ground when connector 911 becomes busy.

Also, relay 7MS, operated as above described, completes an operate path for relay 6MCF (FIG. 6) traced from battery, make contact 7MS–2(6) of relay 7MS, winding of relay 6MCF to ground. (Relays 6MCI and 6MCL are associated with respectively different register circuits.) Operation of relay 6MCF is followed by operation of relay 8MON over an obvious operate path through make contact 6MCF–1(8) of relay 6MCF. Operation of relay 8MON results, in turn, in operation of relays 8IN and 8INA. The operate path for relay 8IN is traced from battery, resistor 810, winding of relay 8IN, make contact 8MON–1(8) of relay 8MON to ground, and the operate path for relay 8INA is traced from battery, resistor 811, break contact 8OP–1(8) of relay 8OP, winding of relay 8INA, make contact 8MON–2(8) of relay 8MON to ground.

Relay 5AA of the insteering circuit (FIG. 5) reoperates at this time from ground, make contact 8MON–3(5) of relay 8MON, break contact 8PLSC–1(5) of relay 8PLSC, break contact 5PLSCA–1(5) of relay 5PLSCA, make contact 6MCF–2(5) of relay 6MCF, break contact 5A–1(5) of relay 5AA, winding of relay 5AA, break contact 6REF–1(5) of relay 6REL to battery. Relay 5AA, upon operating locks to ground through its 5AA–2(5) make contact, lead 511, make contact 7MS–3(5) of relay 7MS and break contact 5OPC1–1(5) of relay 5OPC1.

Figure 6:
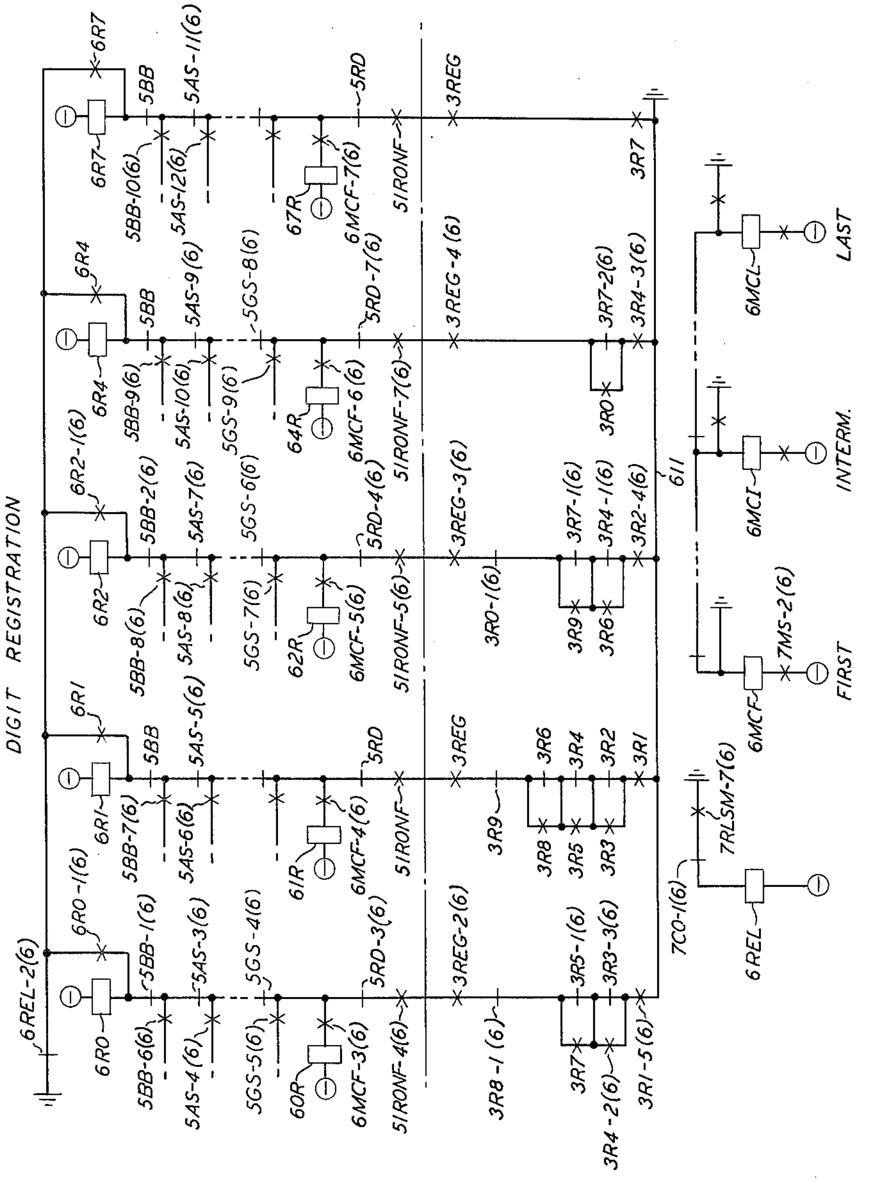
FIG. 6 shows particularly the digit registration circuit.
Figure 7:
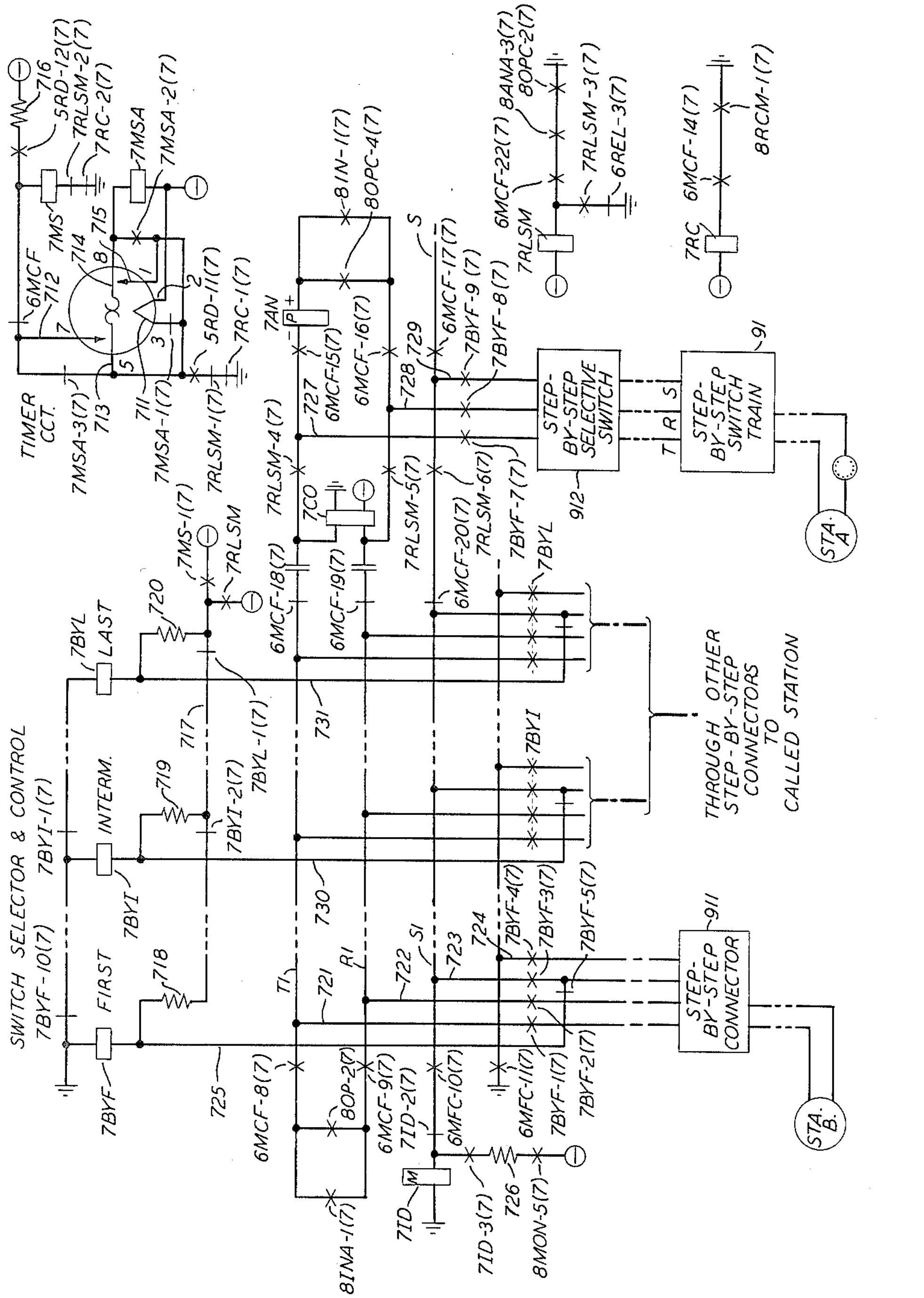
FIG. 7 shows particularly the timer circuit and the pulsing switch selector and control circuit.
Figure 8:
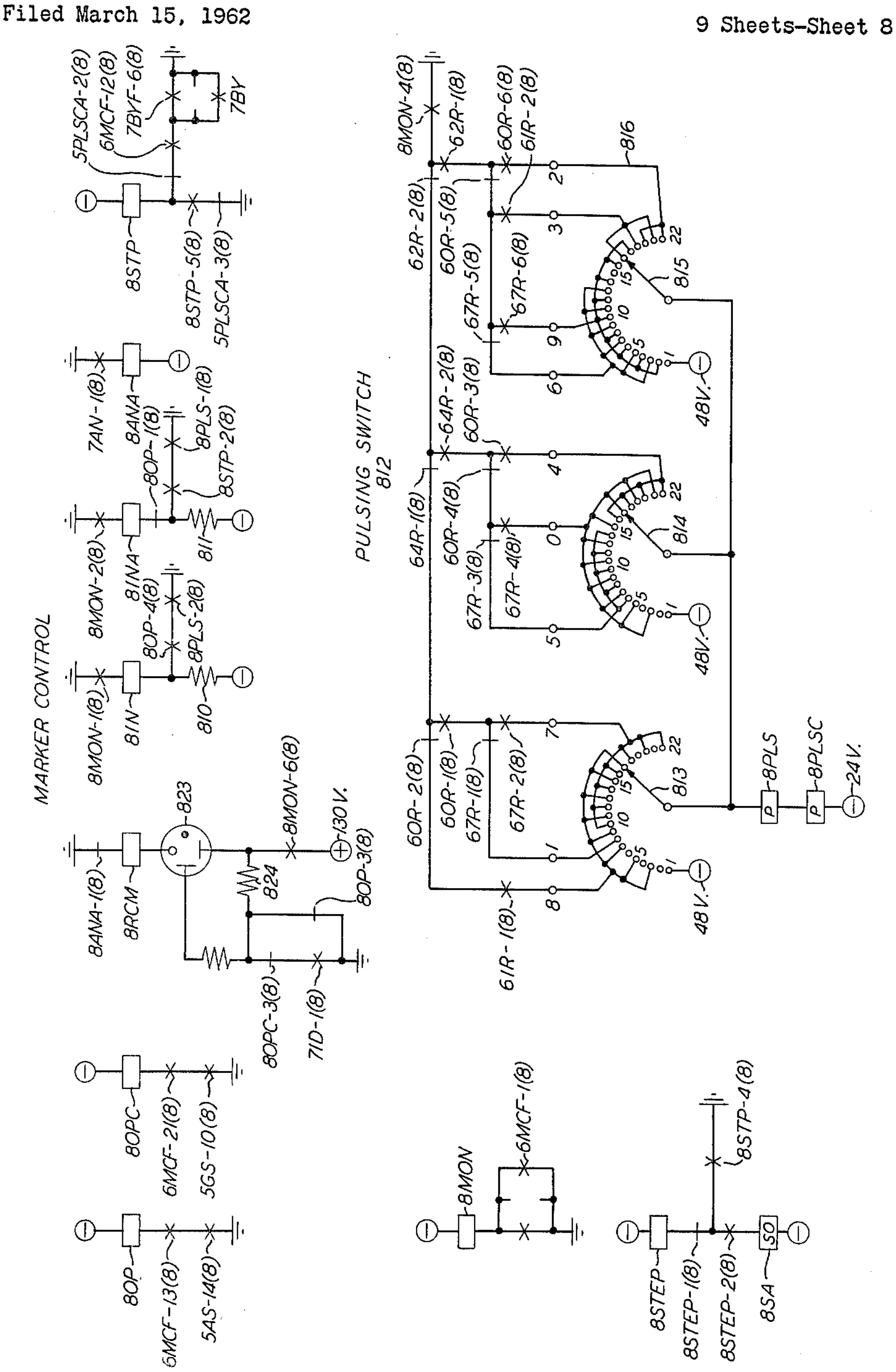
FIG. 8 shows the pulsing switch circuit and portions of the marker control circuit.

Now, the register relays 60R, 61R, 62R, 64R, and 67R of the marker, which are shown for purposes of convenient illustration in FIG. 6 with the register relays 6R0, 6R1, 6R2, 6R4 and 6R7, will operate in accordance with the condition of those relays for the first dialed digit. It will be recalled that in the instance of the first digit, relays 6R0 and 6R2 operated and locked over the respective holding circuits. Accordingly, relays 60R and 62R now operate; relay 60R operates over a path from battery, winding of relay 60R, make contact 6MCF–3(6)

of relay 6MCF, break contact 5GS–4(6) of relay 5GS, break contacts of intervening insteering relays, break contacts 5AS–3(6) of relay 5AS and 5BB–1(6) of relay 5BB, make contact 6R0–1(6) of relay 6R0, break contact 6REL–2(6)of relay 6REL to ground. Relay 62R operates from battery, winding of relay 62R, make contact 6MCF–5(6) of relay 6MCF, break contact 5GS–6(6) of relay 5GS, break contacts of intervening insteering relays, break contacts 5AS–7(6) of relay 5AS and 5BB–2(6) of relay 5BB, make contact 6R2–1(6) of relay 6R2, break contact 6REL–2(6) of relay 6REL to ground. As will be apparent from subsequent description the condition of the marker register relays determines the pulsing action of the pulsing switch.

Relay 7BYF operated as above described, closes at its make contacts 7BYF–1(7), 7BYF–2(7), 7BYF–3(7) and 7BYF–4(7), tip-1, ring-1 and sleeve-1, leads 721, 722 and 723 and control lead 724 through to the selected toll connector (connector 911, FIG. 9), and opens at its 7BYF–5(7) break contact, the connection of lead 725 to the sleeve-1 lead 723. The tip-1—ring-1 loop is closed at make contact 8INA–1(7) of relay 8INA and make contacts 6MCF–8(7) and 6MCF–9(7) of relay 6MCF. The sleeve-1 lead is closed through at make contact 6MCF–10(7) of relay 6MCF and ground is connected to lead 724 at make contact 6MCF–11(7) of relay 6MCF.

Following operation of relay 7BYF, as described above, relay 8STP operates from ground, make contacts 7BYF–6(8) of relay 7BYF and 6MCF–12(8) of relay 6MCF, break contact 5PLSCA–2(8) of relay 5PLSCA, winding of relay 8STP to battery. Relay 8STP, operated, completes a starting path for the stepping relay, 8STEP, of pulsing switch 812, the path being traced from ground, make contact 8STP–4(8) of relay 8STP, break contact 8STEP–1(8) of relay 8STEP, winding of relay 8STEP to battery. Relays 8STEP and relays 8SA now continue in "stepping" operation since with each operation of relay 8STEP its operate path is interrupted and the operate path for relay 8SA is completed, while with each release of relay 8STEP its operate path is re-established while the operate path of relay 8SA is interrupted. The three mechanically connected brushes 813, 814 and 815 of rotary switch 812 are stepped around their respective contact bands by the intermittent operation of relay 8STEP.

As shown, the terminal bank contacts of switch 812 are connected to make and break contacts of the marker register relays 60R, 61R, 62R, 64R and 67R so that completion of respective paths to ground through make contact 8MON–4(8) of relay 8MON is in accord with the condition, operated or released, of the marker register relays. For example, assuming as described above, that relays 60R and 62R are the marker register relays which are operated, a path will be completed to ground for operation of relay 8PLS, and transmission of a pulse, when brush 815 of the rotary switch is in contact with the bank contacts wired to lead 816, the path to ground then being completed through make contacts 60R–6(8) of relay 60R, 62R–1(8) of relay 62R and 8MON–4(8) of relay 8MON.

The pulses are transmitted over the line tip–1 and ring–1, leads 721 and 722 by opening and closing the line loop at make contact 8INA–1(7) of relay 8INA. Relay 8INA operates intermittently during the operation of pulsing switch 812 since at each interval when both relays 8STP and 8PLS are operated the operating battery for relay 8INA through resistor 811 is shunted to ground though make contacts 8STP–2(8) of relay 8STP and 8PLS–1(8) of relay 8PLS. Relay 8INA will release, and then immediately reoperate when relay 8PLS releases.

When the first rotation of brushes 813, 814 and 815 has been completed and the first contact of the respective bank is engaged, relay 8PLSC, which is oppositely poled to relay 8PLS, will operate. This is followed by operation of relay 5PLSCA (a relay of the marker but shown as a part of the insteering circuit, FIG. 5, for convenience of illustration), the operate path being traced from ground, make contacts 8MON–3(5) of relay 8MON and 8PLSC–2(5) of relay 8PLSC, winding of relay 5PLSCA to battery. Relay 5PLSCA, operated, interrupts the stepping operation of pulsing switch 812 since the operating paths of relay 8STP are opened at break contacts 5PLSCA–2(8) and 5PLSCA–3(8) of the relay, and relay 8PLSC releases. Relay 8PLSC, upon releasing, interrupts at its 8PLSC–2(5) make contact, the operating path of relay 5PLSCA which has a slow-to-release characteristic. Before relay 5PLSCA has fully released, a path is completed for operating relay 5BB traced from ground, make contact 8MON–3(5) of relay 8MON, break contact 8PLSC–1(5) of relay 8PLSC, make contacts 5PLSCA–4(5) of relay 5PLSCA (not yet released) and 6MCF–23(5) of relay 6MCF, break contact 5BB–4(5) and winding of relay 5BB, break contact 6REL–1(5) of relay 6REL to battery. Relay 5BB, upon operating, locks to ground through its make contact 5BB–5(5), lead 511, make contact 7MS–3(5) of relay 7MS and break contact 50PC1–1(5) of relay 50PC1. Relay 5PLSCA fully releases practically at the moment relay 5BB operates, whereby to prevent relay 5AS from operating through make contact 5BB–11(5) of relay 5BB.

*Called line still busy when rechecked*

As the digits are pulsed out to the called line at this time through intermittent operation of relay 8INA, as described above, it may well happen, of course, that the called line is still busy on the previous call. In this event the operation of relay 7ID will be prevented by the presence of sleeve ground on lead 723 from the busy connector and recycling will take place as described below. Recycling follows operation of relays 8PLSC and 5PLSCA which operations take place as above described at the end of a complete operation of pulsing switch 812. Relay 5AS reoperates at this time over a path similar to that described above in connection with the reoperation of relay 5BB. That is, before relay 5PLSCA has fully released (following release of relay 8PLSC) relay 5AS operates over a path from ground, make contact 8MON–3(5) of relay 8MON, break contact 8PLSC–1(5) of relay 8PLSC, make contacts 5PLSCA–4(5) of relay 5PLSCA (not yet fully released), 6MCF–23(5) of relay 6MCF and 5BB–11(5) of relay 5BB, break contact 5AS–2(5) of relay 5AS, winding of relay 5AS, break contact 6REL–1(5) of relay 6REL to battery. Relay 5AS, upon operating, locks to ground through its make contact 5AS–1(5), lead 511, make contact 7MS–3(5) of relay 7MS and break contact 50PC1–1(5) of relay 50PC1. Relay 5AS operated, completes an operate path for relay 80P traced from ground, make contacts 5AS–14(8) of relay 5AS and 6MCF–13(8) of relay 6MCF, winding of relay 80P to battery. Relay 80P, operated, interrupts at its 80P–1(8) break contact, the operating path for relay 8INA. The loop previously closed intermittently through make contact 8INA–1(7) of relay 8INA on line conductors 721 and 722 is now closed through make contact 80P–2(7) of relay 80P.

Also, relay 80P, operated, starts timing in the recycle timer since the shunting ground applied through resistor 824 is removed at break contact 80P–3(8). Gas-filled tube 823 is now activated by the potential applied to the start anode through make contact 8MON–6(8) of relay 8MON. When tube 823 fires and becomes conductive, relay 8RCM operates from battery through the tube, winding of relay 8RCM, break contact 8ANA–1(8) of relay 8ANA to ground.

When relay 7RC operates as just described, relays 7MS and 7MSA of the timer circuit (FIG. 7) release as their holding paths are interrupted at respective break contacts 7RC–1(7) and 7RC–2(7) of relay 7RC. This releases the 7BYF relay, as the operate path is opened at make contact 7MS–1(7) of relay 7MS and the subsequent above described operations in connection with calling the called subscriber are discontinued to be repeated in the same manner at the end of the next timer interval and reoperation of relays 7MS and 7MSA. Timing operation of the recycle timer is stopped if the called party is found to be available, is started again upon completion of outpulsing of the calling party number and is stopped if the calling party answers. The exact operations involved will be clear from subsequent detailed description. Suffice it to say at this point that relay 7ID operates if the called party is available, that relay 80PC operates upon completion of the outpulsing of the calling party number and that relay 8ANA operates upon answer by the calling party. Operation of relay 7ID stops the timer since the shunting ground is reapplied through make contact 7ID–1(8), operation of relay 80PC starts the timer since it removes the shunting ground at break contact 80PC–3(8), and operation of relay 8ANA effectively stops the timer since it interrupts the operate path of relay 8RCM at break contact 8ANA–1(8).

*Called line idle when rechecked*

Assuming now that in the above instance the called line was in idle condition when the connection was made thereto; in such case battery will be present on the sleeve lead 723 through normal operation of the toll connector as described for example in the S. Uda et al. Patent 1,925,681 referred to above, the "K" relay of the connector operates and cuts through the tip and ring leads to the called party and the "CO" relay of the called line operates. The battery on lead 723 operates relay 7ID through make contact 6MCF–10(7) of relay 6MCF, break contact 7ID–2(7) and winding of relay 7ID to ground. Relay 7ID operates and locks to ground through its make contact 7ID–3(7), resistor 726 and make concontact 8MON–5(7) of relay 8MON. As pointed out above, operation of relay 7ID stops the operation of the recycle timer by applying shunting ground through its 7ID–1(8) make contact. Also relay 7ID, operated, cuts off sleeve lead 723 at break contact 7ID–2(7) whereby to prevent shunting the winding of relay 7ID by a subsequent sleeve ground.

Outpulsing of the original calling subscriber's number now proceeds in a manner similar to that described above in connection with the outpulsing of the called station number. As pulsing switch 812 rotates, the resulting pulses are transmitted to the original calling subscriber due to the intermittent operating and releasing of relay 8IN which alternately opens and closes the line loop at make contact 8IN–1(7). The intermittent operation of relay 8IN during the pulsing operation of switch 812 results from the fact that each time relay 8PLS operates, the operate battery path for relay 8IN is shunted to ground through make contacts 80P–4(8) of relay 80P and 8PLS–2(8) of relay 8PLS.

At this time tip-1, ring-1, and sleeve-1 leads 727, 728 and 729 are closed to the auxiliary line through make contacts 7BYF–7(7), 7BYF–8(7) and 7BYF–9(7) of relay 7BYF, the loop being closed to these leads through make contacts 6MCF–15(7), 6MCF–16(7), and 6MCF–17(7) of relay 6MCF and opened toward the original called line connection at break contact 6MCF–18(7), 6MCF–19(7) and 6MCF–20(7) of the same relay. As indicated in FIG. 9, the connection to the original calling party over the auxiliary line through step-by-step pulse responsive selective switch 912 may be through the switch train 91 originally involved in the connection if available. A similar switch train may be utilized otherwise. Upon completion of the outpulsing, relay 80PC operates over a path through make contacts 5GS–10(8) of insteering relay 5GS and 6MCF–21(8) of relay 6MCF. As pointed out above, operation of relay 80PC restarts the recycle timer by removing the shunting ground through resistor 824 at its break contact 80PC–3(8). Also, the loop on lines 727 and 728 previously closed intermittently through make contact 8IN–1(7) of relay 8IN is now closed through make contact 80PC–4(7) of relay 80PC.

In the event the original calling party does not respond to the recall within the predetermined timing interval, the circuit is recycled as above described and the calling functions are discontinued until the next interval. If the calling party does respond before expiration of the timing interval on the other hand and goes off-hook, relay 7AN will operate over the line loop due to the normal reversal of battery and ground in the selective switch and switch train. Relay 7AN, operated, completes through its 7AN–1(8) make contact an obvious operate path for relay 8ANA which operates. As pointed out above, operation of relay 8ANA effectively stops the recycle timer since it releases relay 8RCM.

Relay 7RSLM operates at this time over a path from ground, make contacts 80PC–2(7) of relay 80PC, 8ANA–3(7) of relay 8ANA, and 6MCF–22(7) of relay 6MCF, winding of relay 7RLSM to battery. Relay 7RLSM operates and locks to ground through its own make contact 7RSLM–3(7) and break contact 6REL–3(7) of relay 6REL. Relay 7RSLM, operated, closes at its make contacts 7RSLM–4(7) and 7RSLM–5(7) the tip and ring conductors 727 and 728 through to the windings of relay 7CO and this relay operates upon the reversal of ground and battery which resulted when the calling subscriber answered by going off-hook. The original called party is now rung and when he responds the conversation proceeds. (It is assumed that the toll connector 911 and associated switch train utilized in reaching the called subscriber are of a well-known type in which a ground is forwarded over a fourth wiper of any well-known type of four wiper toll selectors to the connector switch. The connector operates in the conventional manner but does not ring the called party until the ground is removed from the fourth wiper of the toll selector switch. This general arrangement is well-known in the art and is referred to, for example, in C. E. Lomax Patent 2,921,980, Jan. 19, 1960, in column 4, line 35 et seq. In the present situation the ground is removed following operation of relay 7CO and the original called party is rung).

Figure 5:
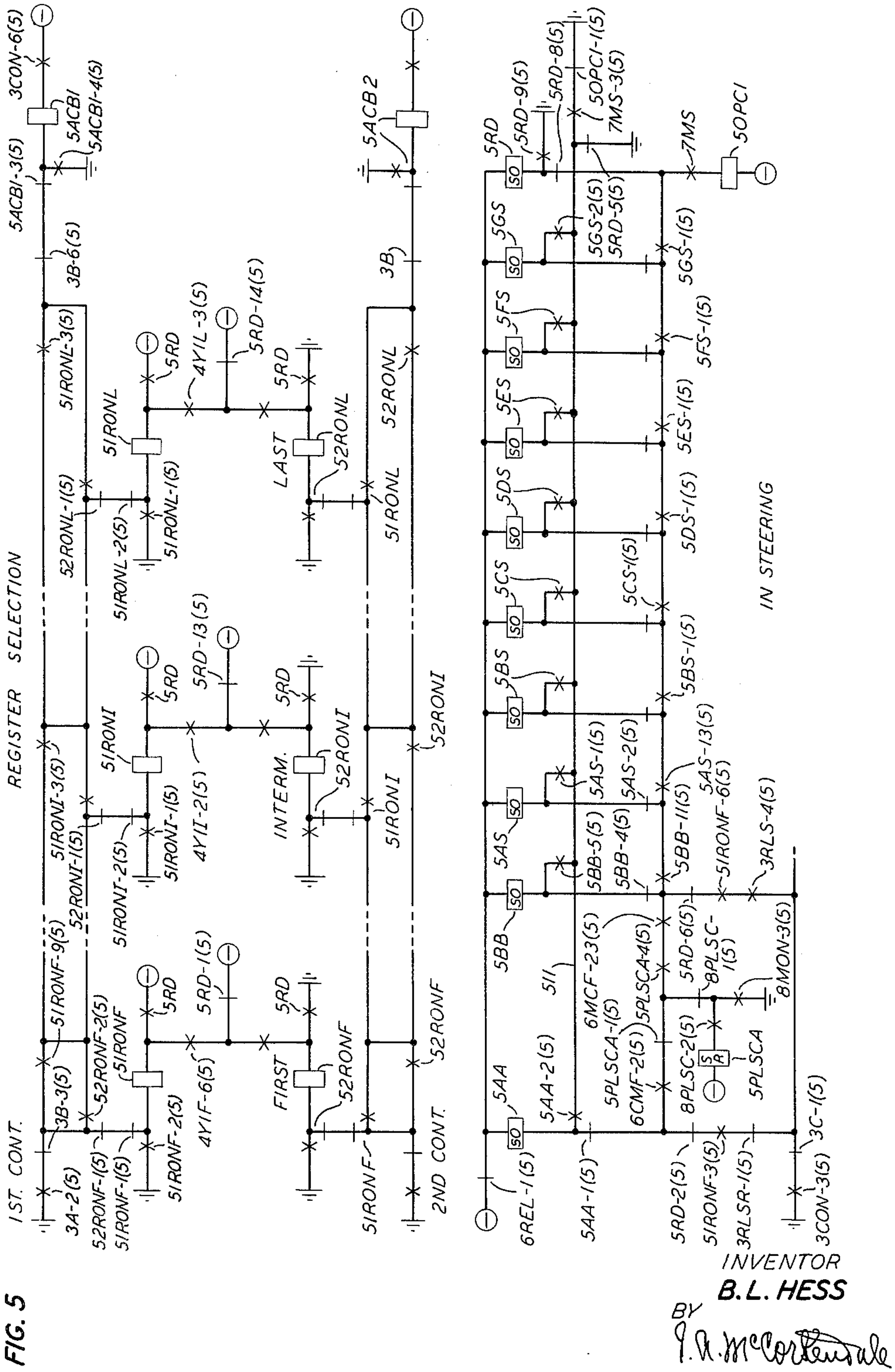
FIG. 5 shows the register selection and the register insteering circuits.

When the conversation is completed and the original calling party goes on-hook, relay 7CO releases due to reversal of battery and ground. Relay 7CO, released, operates relay 6REL over a path from ground, make contact 7RLSM–7(6) of relay 7RLSM, break contact 7CO–1(6) of relay 7CO, winding of relay 6REL to battery. Relay 6REL, operated, releases at its break contact 6REL–2(6) (and corresponding contacts in other registers) all register relays, and releases at its 6REL–1(5) break contact all relays of the insteering circuit (FIG. 5).

It might be pointed out here that the access controller circuits (FIG. 4) serve several different groups of connectors; two access controllers are illustrated. Relay 4SVCF serves the group represented by the "first," "intermediate" and "last" connectors referred to above and shown in FIG. 1 and FIG. 2, that is, the connectors of the first connector board. Thus, if relay 2ZI of the intermediate connector has been operated, battery for operation of relay 4SVCF would have been supplied over lead 112 through make contact 2ZI–2(2) of relay 2ZI and, if relay 2ZL had been operated, battery would then be supplied through make contact 2ZL–2(2) of relay 2ZL.

In the event an "earlier preference" Z relay should operate while a succeeding relay is operated a busy tone will be applied to the associated ring lead from source 213. For example, if relay 1ZF should operate while relay 2ZI is operated the busy tone would be applied to ring 102 through make contact 2ZI–3(2) of relay 2ZI, while if relay 2ZL were operated the busy tone would then be applied through make contact 2ZL–3(2) of that relay.

In the event that all registers were already in use at the time the 1ZF relay operated as above described, it would then be in order to inform the calling subscriber that his call could not be given camp-on service at the moment. Since, as stated, all registers have been selected, relays 51RONI and 51RONL would, of course, be operated in addition to 51RONF previously referred to. The operate path for relay 51RONI would be traced from battery, break contact 5RD–13(5) of relay 5RD, make contact 4Y1I–2(5) of relay 4Y1I, winding of relay 51RONI, break contacts 51RONI–2(5) of relay 51RONI and 52RONI–1(5) of relay 52RONI, make contact 51RONF–9(5) of relay 51RONF, break contact 3B–3(5) of relay 3B (not yet operated), make contact 3A–2(5) of relay 3A to ground, and the operate path for relay 51RONL would be traced from battery, break contact 5RD–14(5) of relay 5RD, make contact 4Y1L–3(5) of relay 4Y1L, winding of relay 51RONL, break contacts 51RONL–2(5) of relay 51RONL and 52RONL–1(5) of relay 52RONL, make contacts 51RONI–3(5) of relay 51RONI and 51RONF–9(5) of relay 51RONF, break contact 3B–3(5) of relay 3B, make contact 3A–2(5) of relay 3A to ground.

An operate path for relay 5ACB1 is now completed, therefore, being traced from ground, make contact 3A–2(5) of relay 3A, break contact 3B–3(5) of relay 3B, make contacts 51RONF–9(5) of relay 51RONF, 51RONI–3(5) of relay 51RONI and 51RONL–3(5) of relay 51RONL, break contacts 3B–6(5) of relay 3B and 5ACB1–3(5) of relay 5ACB1, winding of relay 5ACB1, make contact 3CON–6(5) of relay 3CON to battery. Relay 5ACB1 operates and locks to ground through its 5ACB1–4(5) make contact. Upon operation of relay 5ACB1, announcing machine 317 is connected to tip 101 and ring 102 of the line through make contacts 5ACB1–5(3) and 5ACB1–6(3) of relay 5ACB1 while announcing machine 311 is disconnected therefrom at break contacts 5ACB1–1(3) and 5ACB1–2(3) of the same relay. An appropriate message is now transmitted from announcing machine 317 to the calling subscriber advising him that all units of the camp-on facilities are in use and that he cannot be given camp-on service at the moment.

It will be apparent from the above description that the novel arrangement contemplated by the present invention offers many advantageous and desirable features. Among these are, particularly, that an auxiliary line is set up for the camp-on surveillance or "watching" period, whereby the original calling train and the special connector equipped for camp-on initiation are released for other calls, and that the called line, while seized when on-hook, is not actually rung until the original calling party is available on the line.

While a specific embodiment of the invention has been selected for detailed disclosure, the invention is not, of course, limited in its application to the embodiment disclosed. The embodiment which has been described should be taken as illustrative rather than restrictive thereof.

What is claimed is:

1. In a telephone system, a calling line, a switching center, and a busy called line, means at said switching center for announcing the busy condition of the called line to the calling subscriber and for giving procedural instructions, means at the switching center for registering pulses dialed by the calling station identifying both the calling station and the called station, means effective upon completion of the dialing for releasing the original calling switch train, means effective a predetermined interval following registration of the identifying pulses for checking the condition of said called line, and means effective when said called line is found in nonbusy condition for recalling the calling subscriber.

2. In a telephone system, the combination defined by claim 1 further characterized in additional means effective when the called line is checked and found in busy condition to recycle said checking means.

3. In a telephone system, the combination defined by claim 1 further characterized in additional means effective after said calling subscriber has been recalled and has responded to the recall for ringing the called station.

4. In a telephone system, the combination defined by claim 1 further characterized in additional announcing means effective when all of said registering means are engaged for informing the calling subscriber of that condition.

5. In a telephone system, a calling line, a switching center, and a busy called line, means at said switching center for announcing the busy condition of the called line to the calling subscriber, means at the switching center for registering pulses dialed by the calling party identifying both the called line and his own line, means effective upon completion of the dialing for releasing the calling line, means at said switching center effective a predetermined interval after registration of the identifying pulses for checking the condition of said called line, a timer included in said last-mentioned means, means effective when said called line is found in busy condition for recycling said timer and effective when said called line is found in nonbusy condition for seizing said called line, means effective upon seizure of said called line for ringing said calling line, means effective upon failure of the calling party to respond within a predetermined time to recycle said timer, and means effective upon response by the calling party to ring said called line.

6. In a telephone system, a calling line, a switching center and a busy called line, means at said switching center for indicating the busy condition to the calling subscriber, means at the switching center for registering pulses dialed by the calling party identifying both the called line and his own line, means effective upon completion of the dialing for releasing the calling line, means for establishing an auxiliary connecting line between the switching center and the line terminals of said busy called line, means effective a predetermined interval after the release of said calling line for checking the condition of the called line over said connecting line, and means effective upon said called line being found in nonbusy condition for recalling said calling line.

7. In a telephone system, the combination defined by claim 6 further characterized in means for establishing an auxiliary connecting line between said switching center and said calling line, said calling line being recalled over said last-mentioned auxiliary connecting line.

8. In a telephone system, the combination defined by claim 7 further characterized in means effective upon response by the calling line to said recall to ring said called line.

9. In a telephone system, the combination defined by claim 7 further characterized in the inclusion in said first-mentioned auxiliary connecting line establishing means of selecting means responsive to outpulsing from said registering means of pulses identifying said called line and in the inclusion in said last-mentioned auxiliary connecting line establishing means of selecting means responsive to outpulsing from said registering means of pulses identifying said calling line.

10. In a telephone system, the combination defined by claim 6 further characterized in recycling means effective both to recycle said checking means if said called line is found still busy and to recycle said recalling means if said calling line does not respond to the recall within a predetermined interval.

11. In a telephone system, the combination defined by claim 6 further characterized in that said registering means includes a first group of relays and a second group of relays, means for counting the pulses as dialed by operations of relays in said first group, and means for operating relays in said second group in accordance with the operated or released condition of the relays of the first group.

12. In a step-by-step switching system, a calling line, a busy called line, a switch train and a first connector for interconnecting said calling and called lines, a camp-on circuit, means in said first connector for seizing said camp-on circuit responsive to the busy condition of said called line; said camp-on circuit including means for indicating to said calling line the busy condition of said called line, means for registering pulses thereupon dialed by said calling party identifying both the called line and his own line, whereupon said switch train may be released upon hang up of said calling line, means effective upon registration of said pulses for releasing said first connector, and means effective at predetermined intervals after said registration of said pulses for checking the condition of said called line; means including a second connector for seizing said called line when found in a nonbusy condition, means including said switch train for ringing said calling line upon seizure of said called line, and means effective upon response by said calling line to ring said called line and to establish a talking connection through said switch train, said camp-on circuit and said second connector.

References Cited by the Examiner

UNITED STATES PATENTS

| | | | |
|---|---|---|---|
| 2,291,497 | 7/42 | Newstedt | 179—27 |
| 2,534,500 | 12/50 | Claesson et al. | 179—18 |
| 2,819,345 | 1/58 | Nilsson | 179—18 |

ROBERT H. ROSE, *Primary Examiner.*

WILLIAM C. COOPER, *Examiner.*